US005481080A

United States Patent [19]

Lynum et al.

[11] Patent Number: 5,481,080

[45] Date of Patent: Jan. 2, 1996

[54] PLASMA TORCH WITH A LEAD-IN TUBE

[75] Inventors: Steinar Lynum; Kjell Haugsten, both of Oslo; Ketil Hox; Jan Hugdahl, both of Trondheim, all of Norway

[73] Assignee: Kvaerner Engineering A.S., Lysaker, Norway

[21] Appl. No.: 244,299

[22] PCT Filed: Dec. 11, 1992

[86] PCT No.: PCT/NO92/00198

§ 371 Date: Aug. 12, 1994

§ 102(e) Date: Aug. 12, 1994

[87] PCT Pub. No.: WO93/12634

PCT Pub. Date: Jun. 24, 1993

[30] Foreign Application Priority Data

Dec. 12, 1991 [NO] Norway .................................... 914911

[51] Int. Cl.$^6$ .................................................... B23K 10/00

[52] U.S. Cl. ................................ 219/121.48; 219/121.47; 219/121.49; 219/121.51; 315/111.21

[58] Field of Search ............................ 219/121.52, 121.5, 219/121.51, 121.49, 121.48, 75, 121.47, 76.15, 76.16; 315/111.51, 111.81, 111.21

[56] References Cited

U.S. PATENT DOCUMENTS

| | | | |
|---|---|---|---|
| 4,275,287 | 6/1981 | Hiuratake . | |
| 4,924,061 | 5/1990 | Labat et al. | 219/121.52 |
| 5,103,072 | 4/1992 | Eikeland et al. | 219/121.52 |
| 5,285,046 | 2/1994 | Hansz | 219/121.47 |

FOREIGN PATENT DOCUMENTS

| | | |
|---|---|---|
| 1286241 | 1/1969 | Germany . |
| 995152 | 6/1965 | United Kingdom . |

*Primary Examiner*—Mark H. Paschall
*Attorney, Agent, or Firm*—Cushman Darby & Cushman

[57] ABSTRACT

A plasma torch has two or more tubular electrodes located co-axially with one inside the other for chemical treatment of a reactant and includes a lead-in tube supplying the reactant and which is located co-axially in the inner electrode; the lead-in tube includes a liquid-cooled tube provided with a heat-insulating layer on the outer surface; the lead-in tube has a longitudinal axis along which the lead-in tube can be moved for positioning the nozzle at its lower end in relation to the plasma flame; the nozzle end is replaceable and is shaped with a conical wall portion to define a venturi passage to increase the exit velocity of the reactant; between the lead-in tube and the inner electrode an annular passage is provided through which plasma-forming gas is introduced which can be used to cool the reactant gas.

2 Claims, 1 Drawing Sheet

PLASMA TORCH WITH A LEAD-IN TUBE

Cross reference to related applications; this application is related to co-pending applications Ser. Nos. 08/244,297 filed May 26, 1994, pending; 08/244,298 filed Sep. 22, 1994, pending; 08/307,835 filed Nov. 7, 1994; 08/244,296 filed Dec. 21, 1994, pending; 08/313,301 filed Dec. 22, 1994; 08/307,836 filed Dec. 22, 1994, pending; 08/307,834 filed Dec. 22,1994; 08/244,295 filed Dec. 29, 1994; 08/244,300 filed Jan. 10,1995 and 08/454,116 filed Jun. 2, 1995.

FIELD OF THE INVENTION

The present invention concerns a lead-in tube for the supply of a reactant to a plasma torch. The plasma torch is used for the chemical treatment of a reactant, and it can be supplied with both plasma-forming gas and reactant.

BACKGROUND OF THE INVENTION

From Norwegian patent no. 164 846 there is known an electrically insulated supply tube for admixtures, which is provided centrally in an internal electrode in a plasma torch designed for submersion in a metallurgical smelt.

In U.S. Pat. No. 4 122 293 there is described an external liquid-cooled supply tube for the supply of gas, admixture and electric current to a hollow electrode which is used in an electric arc smelting furnace.

Furthermore, EP 0 178 288 describes a nozzle for a plasma torch specially designed for heating a metallurgical melting pot. The nozzle has an electrode tip attached to a liquid-cooled electrode holder which simultaneously acts as a supply tube for plasma-forming gas and electric current. The electrode tip has a central boring for the plasma-forming gas and the outlet of the boring is designed first as a Laval nozzle and thereafter as a diffuser to permit the gas to be sprayed when it leaves the electrode.

GB 995 152 describes an electric arc torch for a cutting apparatus which emits a jet of gas heated to a very high temperature by means of an electric arc which is struck between a torch body and a workpiece. The torch body consists of one elctrode within an arcing chamber and the exit end of the cutting gas supply pipe can be provided with a venturi nozzle. However, the nozzle is not replaceable.

From U.S. Pat. No. 4 275 287 is known a water-cooled lead-in tube for supply of a reactant to a plasma torch. The lower pare of the lead-in tube is removable in order to facilitate replacement when it is worn after use. However, the lead-in tube is not movable.

During chemical treatment of a reactant, for example during pyrolysis, it is essential that the gas has the correct temperature when it reaches the plasma flame. If the temperature of the gas exceeds a certain value it will react too early. This is undesirable as decomposition products can be formed before the gas reaches the plasma flame, and this can lead to precipitation of such products in the lead-in device and on the electrodes.

It has been found that the known designs of supply devices for gas produce unsatisfactory results when used in a plasma torch which is utilized for chemical treatment of reactant.

SUMMARY OF THE INVENTION

Thus it is an object of the present invention to provide a lead-in device wherein the required temperature and correct rate of reactant supplied to such a plasma torch are achieved.

This object is achieved by a lead-in tube which is characterized by the features in the claims presented.

The plasma torch is composed of tubular electrodes located coaxially inside one another. In its simplest form the torch consists of two electrodes, an external electrode and an internal electrode. The plasma torch can also be provided with more electrodes.

The electrodes can be hollow, provided with cooling channels for the transport of a coolant. All types of solid materials with good thermal and electrical conductivity can be used for liquid-cooled electrodes.

It is preferable to use solid electrodes. Solid electrodes are usually constructed of a material with a high melting point and with good conductivity, such as graphite.

The reactant is fed in through a separate lead-in tube located coaxially in the internal electrode.

The term reactant refers to pure gas or gas mixed with liquid particles or solid particles with which chemical reactions will take place in the plasma flame.

When the lead-in tube is heated in the plasma zone, it is necessary to cool it. It is therefore provided with channels for transport of a coolant. The cooling channels can for example be formed by providing the tube with an internal dividing plate which ends some distance above the bottom of the lead-in tube. The direction of flow of the coolant is provided in such a way that the lowest temperature is obtained in the inner part of the lead-in tube.

It is important for the reactant to have the correct temperature when it is fed into the plasma zone. The desired temperature for methane for example can be in the range of 650 to 700 degrees C. By measuring the temperature at the outlet nozzle of the lead-in tube, for example by means of thermocouples located in the tube, the temperature of the coolant can be adjusted so that the reactant reaches the desired temperature when it leaves the outlet nozzle.

The outer surface of the lead-in tube and especially the lower surface which faces the plasma flame is supplied with a heat-insulating coating.

The lead-in tube with insulating coating has a smaller diameter than the internal diameter of the inner electrode. In the annular passage which is formed between the lead-in tube and the inner electrode, plasma-forming gas or reactant can be supplied. The plasma-forming gas or reactant is at a low temperature when it is supplied and will therefore further contribute to the cooling of the lead-in tube.

The plasma-forming gas may for example be an inert gas such as nitrogen or argon, which normally will non participate in or affect the chemical reaction occurring in the plasma flame. The reactant can also be used as a plasma-forming gas.

The lead-in tube can be moved in the axial direction to enable the nozzle to be adjusted in order to achieve a favourable position in relation to the plasma flame. Advantageous temperature conditions are thereby obtained in the reactant when it reaches the plasma zone and optimal efficiency is achieved in the chemical process.

In the plasma torch consumable electrodes can be used which will have some degree of melting loss, thus altering the length of the electrode. For this reason it is also advantageous if the lead-in tube can be moved so that it can be readjusted and follow the wear on the electrode. The nozzle or the lower part of the lead-in tube which faces the plasma flame are provided so as to be replaceable. This part of the lead-in tube is exposed to high temperatures so that erosion and lacerations can occur on the tube. It is therefore advantageous for the nozzle to be capable of replacement at see intervals.

The nozzle of the lead-in tube can be provided with a conical narrowing, a venturi or Laval nozzle. The reactant will thereby achieve a higher flow rate, thus feeding it more rapidly towards the plasma flame. The gas rate of flow is a parameter for achieving the best possible operating conditions in a plasma torch designed for chemical processes. Since the venturi is replaceable, a nozzle can be chosen which offers optimal gas flow rate for the reactant in use.

With a lead-in tube according to the invention the object is achieved of being able to supply the reactant at the desired temperature and at the correct rate of flow and with the outlet nozzle in the right position in relation to the plasma flame, thereby preventing the reactant from reacting before it reaches the reaction area. This also prevents precipitation of reaction or decomposition products in the nozzle of the lead-in tube and on the electrodes.

Within the scope of the invention the lead-in tube can be used for many different types of plasma torch, such as a plasma torch described in the applicant's Norwegian application no. 91 4907.

BRIEF DESCRIPTION OF THE DRAWINGS

The lead-in tube for a plasma torch according to the present invention will be described in more detail with reference to a drawing which schematically illustrate a preferred embodiment.

FIG. 2 is a view of a portion of the lead-in tube of the present invention but illustrating an alternate embodiment.

DETAILED DESCRIPTION OF THE INVENTION

Figure 1:
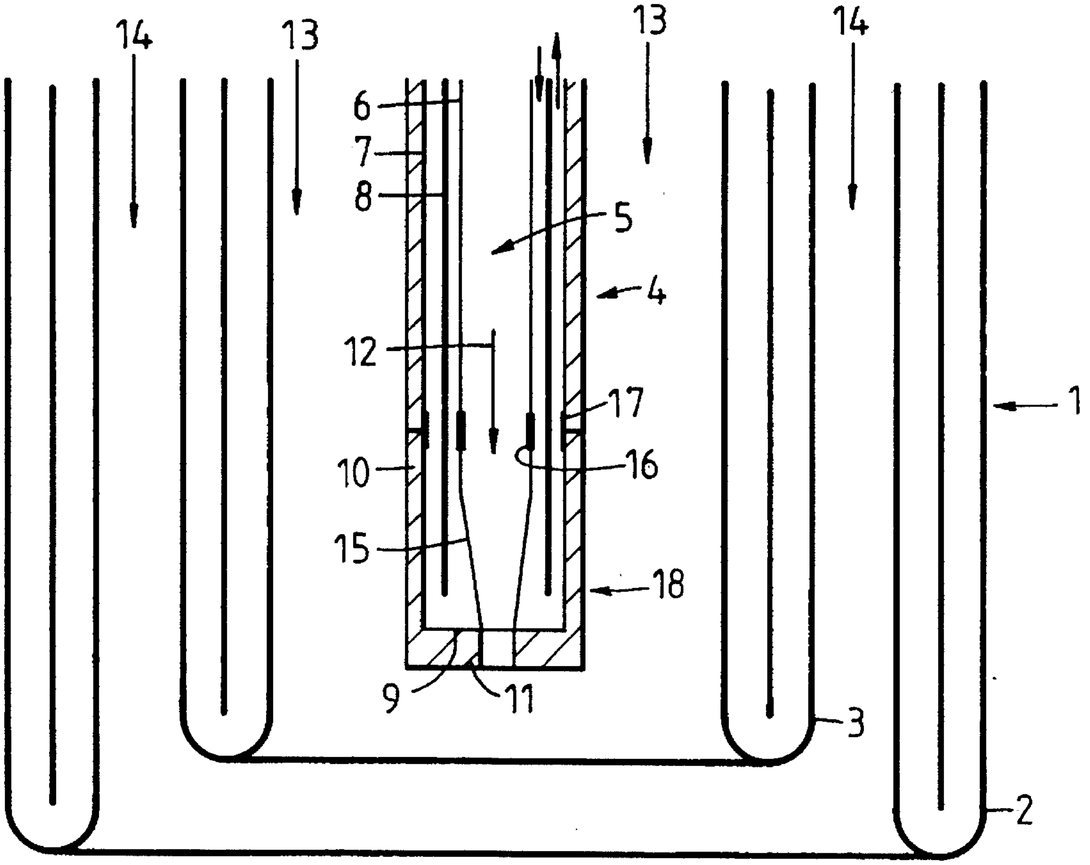
FIG. 1 is a vertical section through a plasma torch with lead-in tube according to the present invention.

In FIG. 1 the plasma torch is indicated by 1. Here it is provided with two electrodes, an external electrode 2 and an internal electrode 3.

The electrodes 2 and 3 are preferably circular and tubular and are located concentrically inside each other. They can be solid or hollow provided with cooling channels for the transport of a coolant. Solid electrodes are preferably constructed of a material with a high melting point and with good electrical conductivity such as graphite or silicon carbide. All types of solid materials with good electrical and thermal conductivity, e.g. copper, can be used for liquid-cooled electrodes.

The plasma torch is provided with a lead-in pipe 5 for reactant. The lead-in pipe 5 consists of an upper part 4 and a lower part 18 which is replaceable. The lead-in pipe 5 is preferably composed of a material with good thermal conductivity, such as copper. The Lube has an interior wall 6 and an exterior wall 7 and is equipped with an internal dividing plate 8 which ends some distance above the bottom of the tube, thereby forming a channel for coolant.

The supply of coolant is provided in such a way that the coolant flows into the channel along the inner surface of the tube 6 and flows out of the channel along the outer surface 7. This is indicated by arrows. With the indicated direction of flow the object is achieved that the lowest temperature is obtained in the inner surface of the lead-in tube.

The outer surface 7 and especially the lower surface 9 of the tube are provided with a heat-insulating coating 10 and 11.

The reactant is fed to the plasma flame through the lead-in tube 5. This is illustrated by the arrow marked 12. The term reactant refers here to pure gas or gas mixed with fluid particles or with solid particles with which chemical reactions will Lake place in the plasma flame.

Between the lead-in tube and the internal electrode and between the internal and the external electrodes annular passages are formed. Through these passages plasma-forming gas can be supplied. This is illustrated by arrows 13 and 14. The plasma-forming gas may for example be an inert gas such as nitrogen or argon, which normally will not participate in or affect the chemical reaction occurring in the plasma flame.

The plasma-forming gas which is fed in through the annular passage between the lead-in tube and the internal electrode is indicated by arrows 13. This gas can be pre-cooled and will further contribute to the cooling of the lead-in tube.

The lead-in tube 5 for the reaction gas can be moved in the axial direction. The equipment for moving the tube is not illustrated in the drawing. The object of moving the lead-in tube is to enable the nozzle to be adjusted so that it attains the correct position in relation to the plasma flame.

The nozzle or the lower part (18) of the lead-in tube is replaceable. The interior and exterior walls of the tube are preferably equipped with a threaded section to enable the nozzle to be screwed off and replaced. The threaded section is indicated by the reference number 16 for the interior tube wall and 17 for the exterior tube wall.

The lower part of the lead-in tube which faces the plasma flame is designed in a conical form, thus producing a tapering towards the outlet of the pipe in the form of a venturi nozzle 15.

When the reactant is forced through the nozzle 15 it will achieve a higher rate of flow and it will be fed more rapidly towards the plasma flame. The rate of flow is dependent of the shape of the venturi nozzle. As the lower part 18 of the lead-in tube 5 is replaceable, the correct rate of flow can be adjusted in such a way that the desired quality is produced depending on the reactant used.

We claim:

1. A lead-in tube for the supply of reactant, said lead in tube having a longitudinal axis and disposed centrally in an inner electrode of a plasma torch, said plasma torch comprising at least two tubular electrodes located coaxially with one inside the other of said two electrodes, said lead-in tube having cooling passages and having an outer surface and a nozzle end which are provided with a thermally insulating coating, said lead-in tube being movable in a direction along said longitudinal axis to adjust the position of said nozzle end relative to the plasma flame, said nozzle end being detachable for replacement and having a conical wall portion forming a venturi passage to provide optimum gas velocity for the reactant.

2. A lead-in tube for the supply of reactant, said lead in tube having a longitudinal axis and disposed centrally in an inner electrode of a plasma torch, said plasma torch comprising at least two tubular electrodes located coaxially with one inside the other, said lead-in tube having cooling passages and having an outer surface and a nozzle end which are provided with a thermally insulating coating, said lead-in tube being movable in a direction along said longitudinal axis to adjust the position of said nozzle end relative to the plasma flame, said nozzle end being detachable for replacement and having a conical wall portion forming a venturi passage to provide optimum gas velocity for the reactant, said nozzle end having temperature measuring elements for adjustment of a coolant to obtain a correct temperature in the reactant.

* * * * *